United States Patent [19]

Simons

[11] Patent Number: 5,669,808
[45] Date of Patent: Sep. 23, 1997

[54] COMBINATION FILE AND ABRADING ASSEMBLY KIT FOR STRAIGHT LINE ABRADING TOOLS

[76] Inventor: Frederick Castorf Simons, 1505 First Ave. W., Newton, Iowa 50208

[21] Appl. No.: 402,002

[22] Filed: Mar. 10, 1995

[51] Int. Cl.⁶ .................................................. B24B 23/00
[52] U.S. Cl. ......................... 451/524; 451/525; 451/356; 29/76.1; 29/76.4
[58] Field of Search ............................. 451/344, 356, 451/434, 522, 523, 524, 525, 557; 29/76.1, 76.2, 76.3, 76.4, 79, 80

[56] References Cited

U.S. PATENT DOCUMENTS

| 2,282,648 | 5/1942 | Drefahl | 29/76.4 |
| 2,722,917 | 11/1955 | Geller | 29/76.4 |
| 3,108,409 | 10/1963 | Hendrickson | 29/76.1 |
| 3,145,449 | 8/1964 | Johnson et al. | 451/356 |
| 3,214,823 | 11/1965 | Hendrickson | 29/76.1 |
| 4,423,571 | 1/1984 | Selander et al. | 451/356 |

FOREIGN PATENT DOCUMENTS

| 2100638 | 1/1983 | United Kingdom | 29/76.4 |

*Primary Examiner*—Eileen P. Morgan

[57] ABSTRACT

Combination Shoe Assemblies for Power Straight Line Abrading or Hand Tool having a support rail (10) which either multiples of the grafting file (12) placed end-to-end, or multiples of the sandpaper shoe assembly (14) of common manufacture, placed end-to-end, are attached. The assembled unit is attached to either a power straight line abrading tool (34) or to a handgrip (32) to facilitate use. Multiples of the elongated relief slot (22) as well as both support rail end opening (40) are provided in support rail (10) for necessary expulsion of waste from grafting file (12) while abrading.

2 Claims, 4 Drawing Sheets

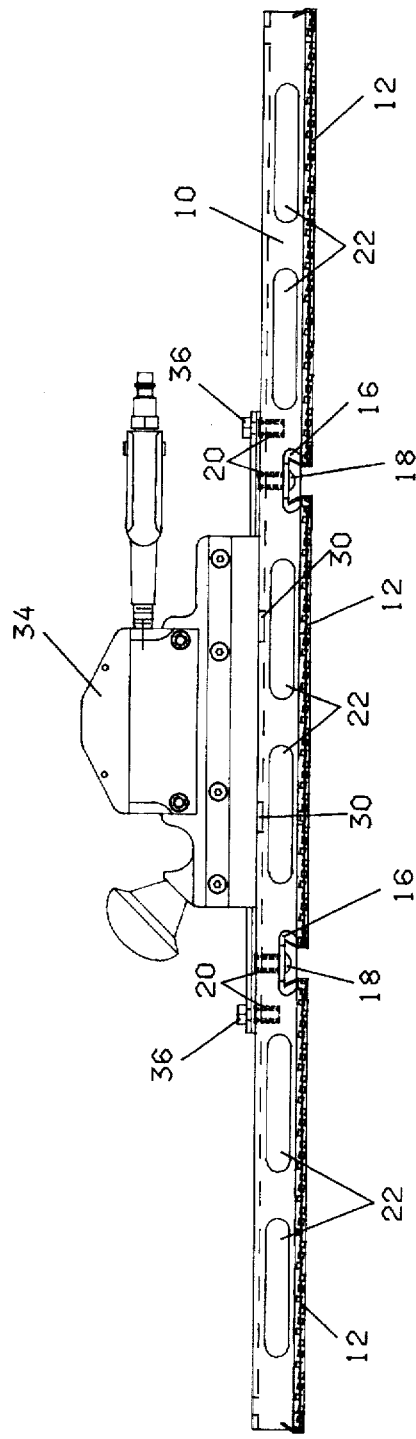
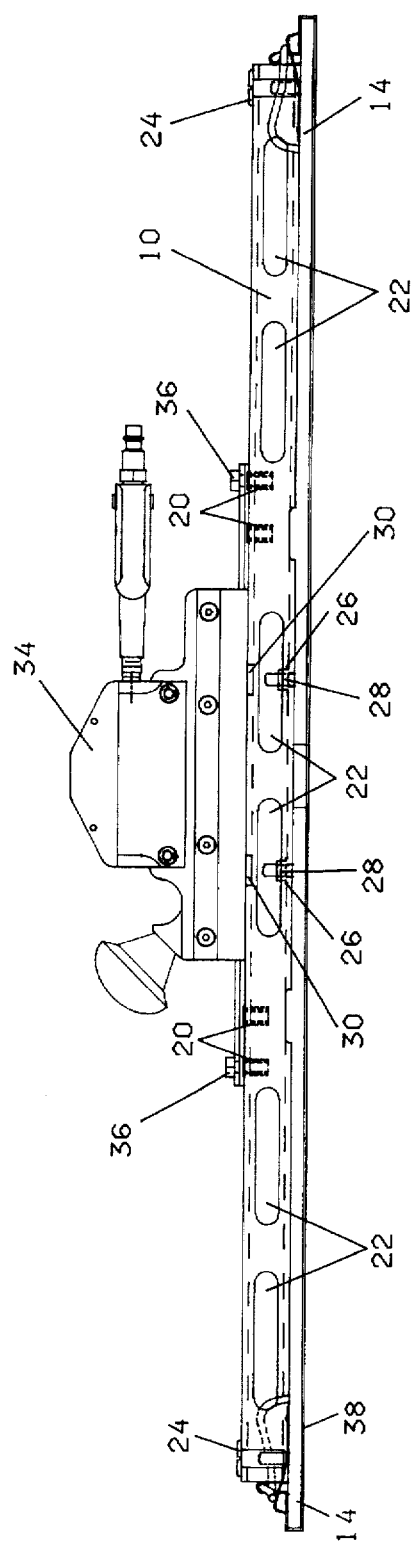

COMBINATION FILE AND ABRADING ASSEMBLY KIT FOR STRAIGHT LINE ABRADING TOOLS

CROSS REFERENCES TO RELATED APPLICATIONS

Combination double length sanding board and tripled mounted autobody filler shaper blades. Disclosure Document No. 354160.

BACKGROUND—FIELD OF INVENTION

This invention relates to straight line abrading tools, used in automotive body work; specifically to the abrading shoe assembly used on those tools.

BACKGROUND—DESCRIPTION OF PRIOR ART

To achieve a smooth finish on automotive body work, it has always been necessary to use various abrasives. Present straight line abrading tools were developed to help achieve a better quality finish with less work than when the job was done by hand. The present tools consist of an abrading shoe assembly attached to a tool body in such a way the shoe assembly will reciprocate relative to the body. These tools generally have a standard length shoe assembly to allow any common brand of abrasive to be used.

Very rough body work initially requires use of more than a sandpaper type of abrasive to begin the smoothing process. For this kind of situation, grafting files were devised to cut body fillers, much as a cheese grater cuts cheese. Standard length for these files is either ten or fourteen inches. These files, generally operated by hand, have been attached to power straight line abrading tools, such as "The Super Viking" conversion kit, made by Commercial Utility Tool, U.S. Pat. No. 4,423,571, Jan. 3, 1984, by Karl W. Selander, Quick Change Shoe Assembly for Straight Line Sander. Use of present grafting files on large areas, although not for finish work, can give less than satisfactory results. Existing adaptations of grafting files to straight line abrading tools are costly to replace, further reducing their usefulness.

While a straight line abrading tool with an abrading shoe assembly can offer a vast improvement in quality workmanship when compared to working by hand, because of its short overall length, it is still inadequate for giving professional consistency and accuracy on very large, relatively flat surface areas as found on big or long vehicles. One attempt to produce an abrading tool to give a better consistency on large surface areas resulted in the Style-liner Multi Contour Sander-SLRS-1, made by Style-Line Corporation. This sander is build to run along a support rail attached to the surface of a vehicle with suction cups, allowing the sander to easily follow a straight line over a greater distance than before. While offering some improvement in finish, it also creates its own problems since the process of sanding must continually be interrupted to pull the suction cupped unit of the vehicle and re-align it. This procedure is time consuming, it also creates uneven results if not properly set up to overlap the previous pattern to eliminate high spots.

Therefore the need exists to devise a combination file and abrading assembly for common straight line abrading tools allowing quick and easy installation of both abrading shoes and files onto the tool body. At the same time, the combination assembly must be constructed to provide better results when used on large surface areas.

OBJECTS AND ADVANTAGES

The objects and advantages of the invention are as follows:

A.) To provide an improved abrading shoe assembly for straight line abrading tools that an be used to smooth large or long surface areas with increased accuracy and ease of operation, providing a better and more consistent result than previous tools;

B.) To provide an improved abrading shoe assembly that can be manufactured without requiring the development of new or costly abrasives, or abrasive mounting hardware, by using common equipment;

C.) To provide a way to attach, by means of my support rail, grafting files to a power straight line abrading tool which is easier to use and cheaper to replace than common models, and at the same time avoiding costly development of new grafting file hardware by the use of common, readily available equipment;

D.) To provide a combination assembly capable of handling both sanding shoes and grafting files that interchange to reduce production cost, time and material;

E.) To provide a combination assembly easily adapted to common power straight line abrading tools, or usable by hand.

BRIEF DESCRIPTION OF THE DRAWINGS

FIG. 6 is a full perspective view in detail of a power straight line abrading tool on support rail assembly with grafting files.

FIG. 7 is a full perspective view in detail of a power straight line abrading tool on support rail assembly with sandpaper shoe assemblies.

Figure 1:
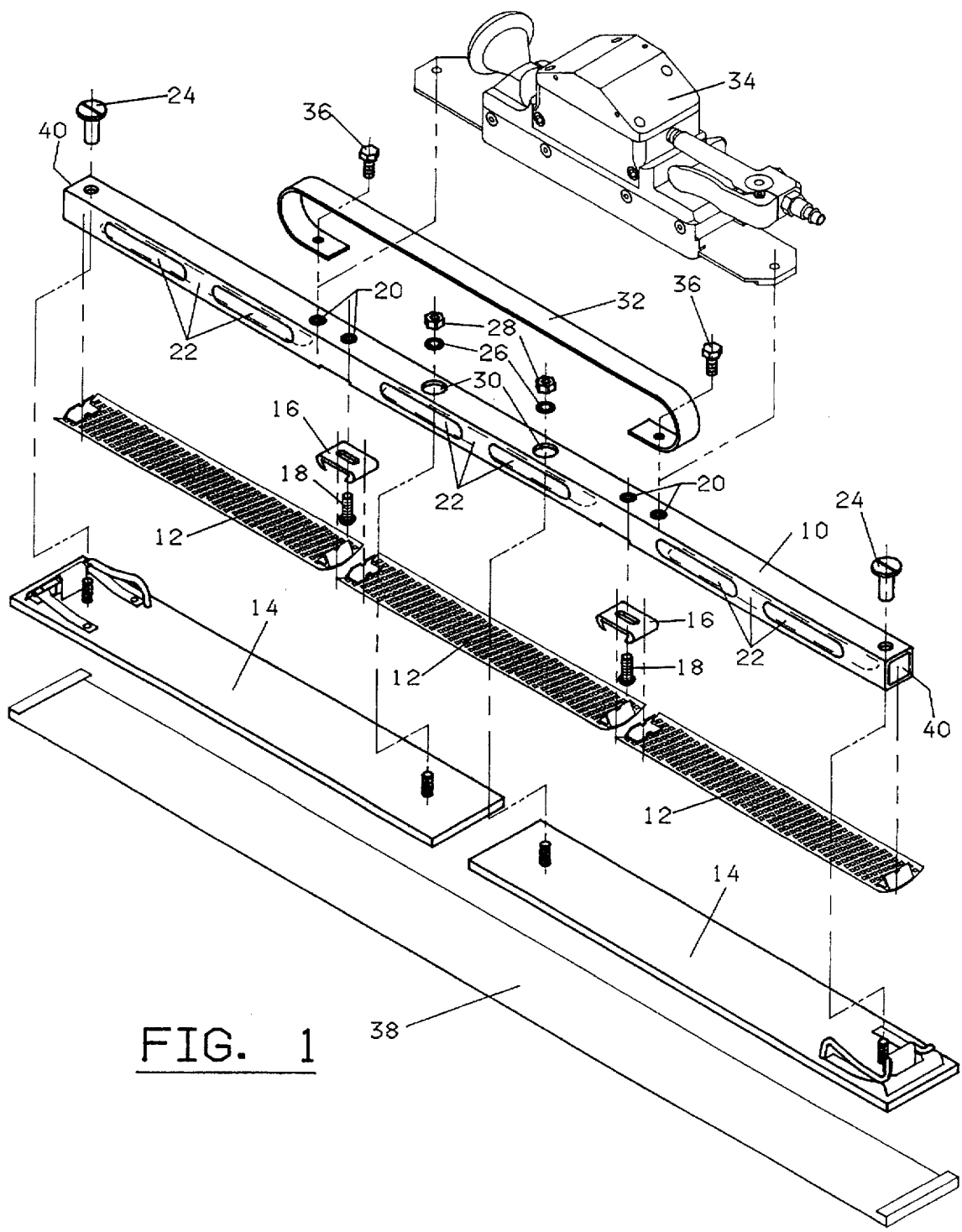
FIG. 1 is a perspective view of the Combination Shoe Assemblies for Power Straight Line Abrading or Hand Tool, embodying the invention.

| Reference Numerals | |
|---|---|
| 10 Support rail | 26 Lockwashers |
| 12 Grafting File(s) | 28 Nuts |
| 14 Sandpaper Shoe Assembly(s) | 30 Socket Access Holes |
| 16 Clamp(s) | 32 Handgrip |
| 18 Socket Head Cap Screw(s) | 34 Power Straight Line Abrading Tool |
| 20 Blind Nuts | 36 Bolt(s) |
| 22 Elongated Relief Slots | 38 Sandpaper |
| 24 Screw Post(s) | 40 Support Rail End Opening(s) |

SUMMARY

The PTO's Rule 73, requiring that specification contain a summary of the claimed invention, and Rule 72, requiring an abstract of the entire specification, has been omitted since the abstract, as well as the claims, already provide one.

PREFERRED EMBODIMENT—DESCRIPTION

Figure 2:
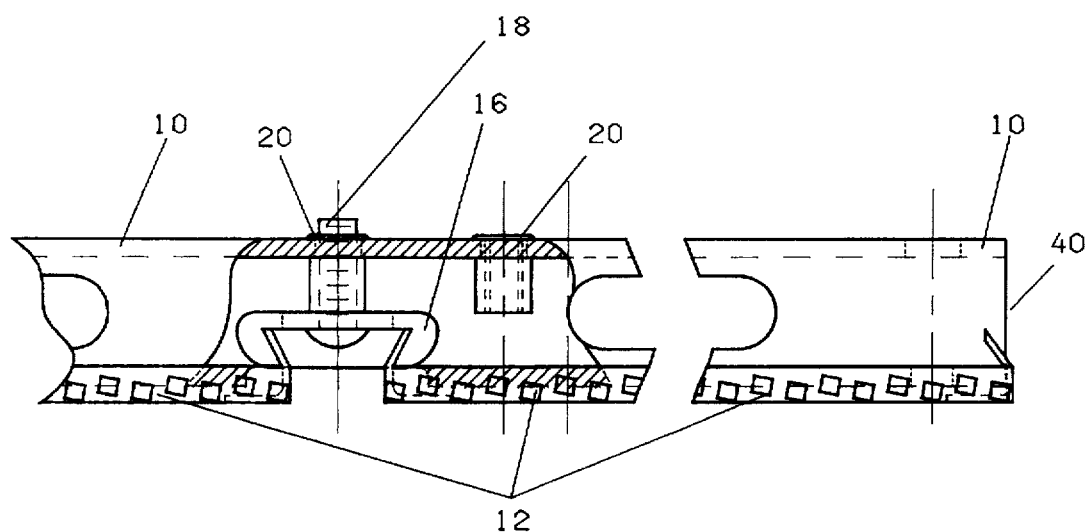
FIG. 2 is a sectional view in detail of the support rail with clamp and grafting files installed.
Figure 3:
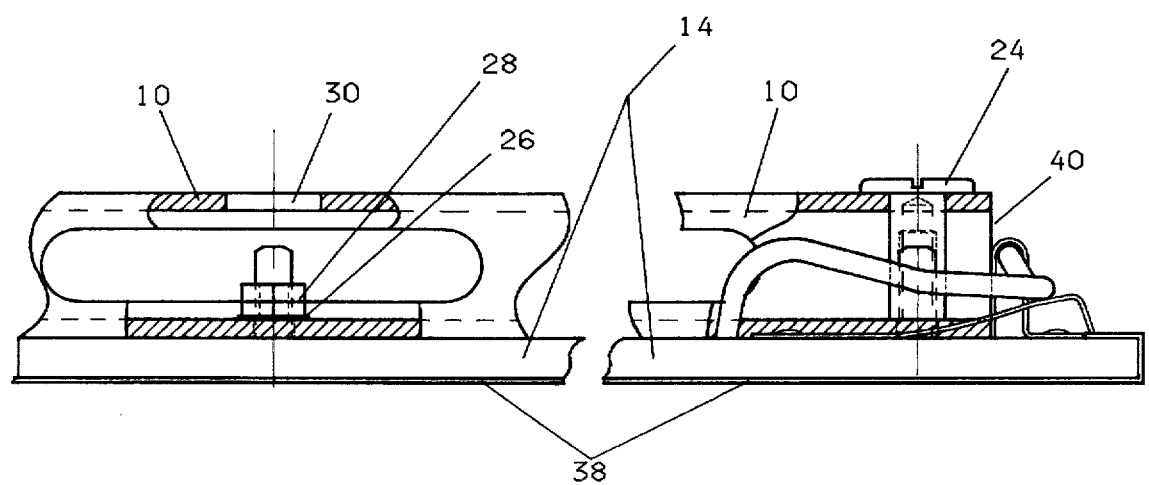
FIG. 3 is a sectional view in detail of the support rail with sandpaper shoe assembly installed.
Figure 4:
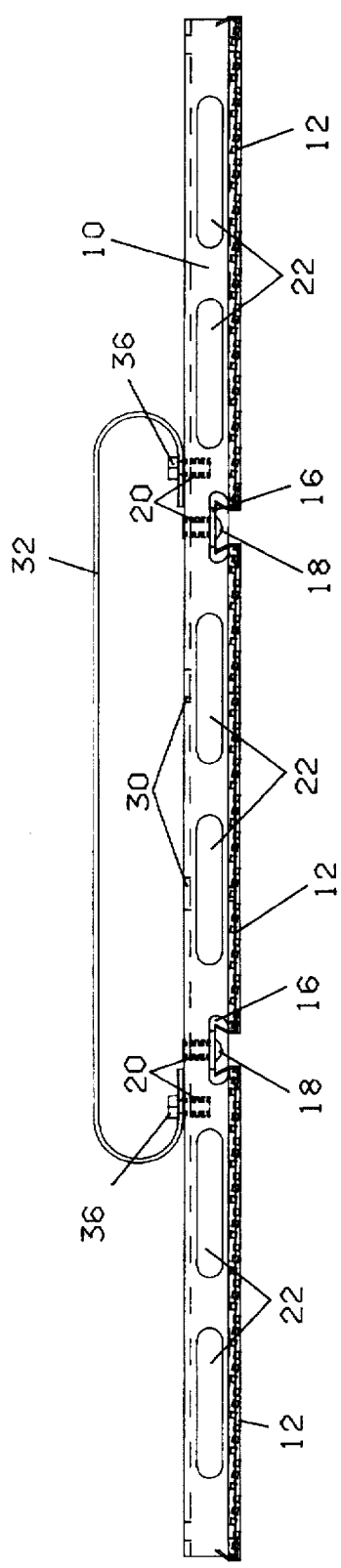
FIG. 4 is a full perspective view in detail of the handgrip and support rail assembly with grafting files.
Figure 5:
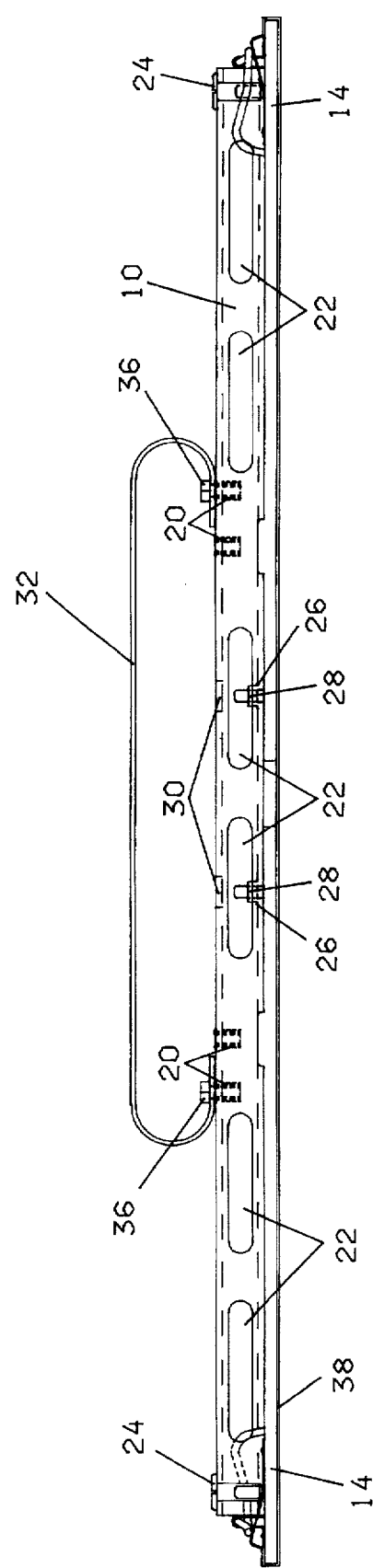
FIG. 5 is a full perspective view in detail of the handgrip and support rail assembly with sandpaper shoe assemblies.

FIG. 1 shows a perspective view of a basic version of my Combination Shoe Assemblies for Power Straight Line Abrading or Hand Tool, comprising a support rail 10 of an appropriate material and predetermined dimension to which either multiples of a grafting file 12, placed end-to-end, or multiples of a sandpaper shoe assembly 14, placed end-to-end, of common manufacture and standard dimension, can be attached. FIG. 2 shows a sectional view in detail of rail with files installed, and FIG. 3 shows a sectional view in detail or rail with shoes installed. FIG. 4 shows a full perspective view of rail with files installed, attached to a handgrip 32, for operating by hand. FIG. 5 shows a full perspective view of rail with shoes installed, attached to the handgrip, for operating by hand. FIG. 6 shows a full perspective view of rail with files installed, attached to a power straight line abrading tool 34, for operation by pneumatic or electrical power. FIG. 7 shows a full perspective view of rail with shoes installed, attached to power tool, for operation by pneumatic or electrical power.

The preferred embodiment of the present invention will now be described in connection with FIGS. 1 and 2 of the drawings. The grafting files are attached with cutting edges aligned in one direction to the support rail by first hooking the tang or prong of one file over a support rail end opening 40 and then into a clamp 16. Then, one end tang of another file is hooked into the other side of the same clamp; the clamp being positioned into the corresponding opening in the bottom of rail. A socket head cap screw 18 is started through the opening in clamp and threaded into a blind-nuts 20 in rail. The opposite end tang of second file is hooked into another clamp, as is one end tang of third file. Then the opposite third file end is placed over the last rail end opening. The second clamp is positioned into the corresponding opening in rail and another screw is started through clamp and threaded into corresponding blind-nut in rail. Then screws are tightened alternately until the end tang of the last file is hooked over the rail end opening. As screws draw clamps up toward the top side of rail the angle of clamps pull against the angle of the end tangs of files causing all files to be drawn together and locked over both rail ends. A multiple of a elongated relied slot 22 in bottom and sides of rail, along with the end openings, allow grafting waste to be expelled. Alternative mounting methods for attaching files to rail being used, such as replacing clamps with specifically manufactured spring clips that are attached directly to rail (not pictured), and replacing the multiple of files of common manufacture with a single, specifically manufactured grafting file (not pictured).

The preferred embodiment of the present invention will not be described in connection with FIGS. 1 and 3 of the drawings. A multiple of the sandpaper shoe assembly for securing a sandpaper 38 can be attached to the support rail in place of grafting files. The shoe assembly of common manufacture is constructed with a sandpaper holding clamp on one end and mounting studs on both ends, and is attached to rail with the holding clamp toward the outer end of rail. It is understood a specifically manufactured single sandpaper shoe assembly (not pictured) could be utilized. The shoe assembly is attached to rail by inserting the studs on shoe into corresponding holes in rail. At the outer ends of rail, shoe is secured by a screw post 24, which is threaded onto corresponding studs on shoe. Toward the center of rail, shoe is secured by a lockwashers 26 and a nuts 28, which is threaded onto the corresponding studs on shoe. A socket access holes 30 is provided to allow access to the interior of rail to facilitate the tightening of nuts.

The assembled unit, comprising of the support rail and either grafting files, end-to-end, or sandpaper shoe assemblies, end-to-end, is then attached to either a handgrip 32 as shown in FIGS. 4 and 5 or a power straight line abrading tool 34 as shown in FIGS. 6 and 7 by multiples of a bolt 36, which are threaded into a multiple of corresponding blind-nuts.

PREFERRED EMBODIMENTS—OPERATION

The manner of using a Combination Shoe Assemblies for Power Straight Line Abrading or Hand Tool is similar to grafting files or sanding units in present use. One places the appropriate filing or sanding unit against the surface to be abraded and, if being operated by hand, applies the necessary pressure to the unit and moves it reciprocally over that surface. If unit is attached to a power operated tool, the operator has only to guide the unit across the surface, as the power tool is designed to automatically reciprocate the unit. The present invention allows both a grafting file 12, it multiples, and a sandpaper shoe assembly 14, in multiples, to be alternately attached to a support rail 10; therefore the operation of either filing or sanding can be accomplished with the same basic tool.

As shown in FIGS. 4 and 6, with grafting file attached to support rail by a clamp 16 and a socket head cap screw 18 threaded into a blind-nuts 20 along with tang ends of file being hooked over a support rail end opening 40 as shown in FIGS. 1 and 2, the tool is setup for the initial rough cutting operation of working body fillers. Since a body filler file does not require a high number of strokes per minute to give the desired results, it is preferably to use the rail with a handgrip 32 attached with a bolt 36, when equipped with file. The cutting is done only on the forward stroke, with the operator applying pressure as needed to achieve the desired cut; on the return stroke, the operator guides the file assembly back to where the cutting is to begin again, applying no pressure. To achieve a uniform cutting depth over a large area, an overlapping alignment of cutting strokes can be obtained by movement of the file assembly at slight angles in both directions to create a cross-hatch pattern, while still basically cutting in a straight line. A more concentrated cutting edge can be obtained by using half round grafting file, rather than flat. A power straight line abrading tool 34, as shown in FIG. 6, may be used with grafting tools having a forward and backward cutting edges. A elongated relief slot 22 of a multiple number, FIG. 1, are provided to expel grafting waste away from the grafting file.

Once the body filler has been worked to the point where a smoother, finished surface is required, remove grafting file by loosening cap screws from clamps of the support rail and install the sandpaper shoe assembly securing a sandpaper 38 onto the support rail with a screw post 24, a lockwashers 26 and a nuts 28 as shown in FIGS. 3, 5 and 7. A socket access hole 30 is provided to allow access to the interior of the support rail to facilitate loosening of nuts. The operator is then ready for the finishing portion of working the body filler. Since the sanding of body fillers generally gives a better overall finish when done at a high number of strokes per minutes, it is preferable to attach the support rail to power straight line abrading tool with a bolt 36. With the reciprocation of the sanding assembly being accomplished by the power tool, the operator needs only to guide the tool across the surface that is to be sanded. Sanding will occur on both the forward and reverse strokes of the reciprocating assembly. To achieve a more uniformly sanded surface over a large area, an overlapping alignment of sanding strokes can be obtained, as with the file, by movement of the sanding assembly in a cross-hatch pattern over the surface. If a power sander is not available the sandpaper shoe assemblies may be hand powered by placing the handgrip on the support rail by means of bolt threaded into blind-nuts as shown in FIGS. 1 and 5.

CONCLUSIONS, RAMIFICATIONS AND SCOPE

Accordingly, it can be seen the support rail and handgrip of this invention can provide increased accuracy and east of operation for abrading large surface areas because of its overall length, and because of its construction, can be manufactured without costly development of all new abrading hardware. Furthermore, the support rail and handgrip has the additional advantages in it provides an assembly;

Easily adapted to either existing power abrading tools or use by hand;

Capable of handling both abrasive and file interchangeably;

Capable of using common abrading and filing equipment, making it easy for the operator to obtain abrasive and/or file without having to rely on one specific brand from a specific dealer, therefore reducing operator cost.

Although the description above contains many specifics, these should not be construed as limiting the scope of the invention, but as merely providing illustrations of some of the presently preferred embodiments of this invention. Various other embodiments and ramifications are possible within its scope. For example, the support rail can have other shapes and dimensions, as can the handgrip; and abrading assembly and file of common manufacture can be replaced by specifically manufactured units or mounted to the support rail by other methods.

Thus the scope of the invention should be determined by the appended claims and their legal equivalents, rather than by the examples given.

I claim:

1. A rail assembly for being interchangeably attached to either a power abrading tool or to a hand tool, said rail assembly comprising:

a support rail having first means for being selectively attached to either a power abrading tool or a handgrip; said support rail having second means for selectively supporting either a plurality of grafting files placed end-to-end on said support, or a plurality of sanding shoes placed end-to-end on said support.

2. The rail assembly of claim 1 wherein said support rail is an elongated, rectangular member having a base, top, and two side surfaces, and opposite end surfaces, said base and side surfaces having a plurality of elongated relief slots and said end surfaces having openings therein for expulsion of waste generated during operation.

* * * * *